United States Patent
Li et al.

(10) Patent No.: US 9,195,254 B2
(45) Date of Patent: Nov. 24, 2015

(54) METHOD AND APPARATUS FOR MULTI-LEVEL DE-EMPHASIS

(71) Applicant: QUALCOMM Incorporated, San Diego, CA (US)

(72) Inventors: Miao Li, San Diego, CA (US); Madjid Hafizi, San Diego, CA (US); Xiaohua Kong, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 150 days.

(21) Appl. No.: 13/725,961

(22) Filed: Dec. 21, 2012

(65) Prior Publication Data

US 2014/0176196 A1    Jun. 26, 2014

(51) Int. Cl.
*H03K 3/00* (2006.01)
*G05F 3/26* (2006.01)
*H04L 25/03* (2006.01)

(52) U.S. Cl.
CPC .......... *G05F 3/262* (2013.01); *H04L 25/03847* (2013.01)

(58) Field of Classification Search
USPC ........................................................ 327/407
See application file for complete search history.

(56) References Cited

U.S. PATENT DOCUMENTS

| | | | |
|---|---|---|---|
| 6,958,742 B2 | 10/2005 | Date et al. | |
| 7,061,307 B2 | 6/2006 | Iroaga | |
| 7,365,594 B2 * | 4/2008 | Kojima et al. | 327/538 |
| 7,636,014 B1 * | 12/2009 | Chen | 330/254 |
| 8,248,135 B2 | 8/2012 | Yu et al. | |
| 2008/0252665 A1 * | 10/2008 | Date | 345/690 |
| 2009/0315617 A1 * | 12/2009 | Rosik et al. | 327/538 |
| 2011/0242342 A1 * | 10/2011 | Goma et al. | 348/218.1 |
| 2011/0304362 A1 * | 12/2011 | Matsubara | 327/109 |
| 2012/0049897 A1 | 3/2012 | Kubo | |
| 2012/0206200 A1 * | 8/2012 | Spaeth | 330/252 |

OTHER PUBLICATIONS

Paul Horowitz, 1989, the art of Electronics, $2^{nd}$ edition, Cambridge University Press, p. 121.*

* cited by examiner

*Primary Examiner* — Lincoln Donovan
*Assistant Examiner* — Patrick Chen
(74) *Attorney, Agent, or Firm* — Paul S. Holdaway

(57) ABSTRACT

A distribution current is split into a first control current, a second control current, and a third control current, in an apportionment according to a distribution command. A first control voltage is generated in response to the third control current. A second control voltage is generated as indication of the first control current, and a third control voltage is generated as indication of the second control current. Optionally, de-emphasis contribution of a first driver, a second driver and a third driver to an output is controlled based, at least in part, on the first control voltage, the second control voltage and the third control voltage, respectively.

39 Claims, 6 Drawing Sheets

METHOD AND APPARATUS FOR MULTI-LEVEL DE-EMPHASIS

FIELD OF DISCLOSURE

The present Application for Patent relates to line drivers, more particularly, to de-emphasis transmission line drivers.

BACKGROUND

High-speed communication of symbols over a channel can incur symbol distortion due to characteristics of the channel causing a spreading in time of the signal energy. The spreading can be such that, when a given symbol in a sequence is decoded, energy from the symbol preceding and succeeding that symbol may have leaked, or spread into the time interval of the given symbol. A result can be distortion of the given symbol that can in turn cause error in the decoding.

One conventional technique for compensating such channel conditions, and therefore reducing inter-symbol interference (ISI), is termed "de-emphasis" (sometimes alternatively referred to as "pre-emphasis" or "transmission de-emphasis") in the transmission of the symbol. Transmission de-emphasis generally entails adding to each symbol, often called a "current symbol" or "cursor," a weighted sum of the cursor, and one or more symbols preceding the cursor, or one or more symbols succeeding the cursor, or both. The weighted sum can be implemented as a "finite impulse response" or (FIR) filter, generally formed as a chain of delay elements or "taps," each feeding a multiplier that applies an assigned weight or "tap coefficient." The output of the multipliers is summed to obtain the pre-emphasis transmission signal. The tap coefficients are selected in view of objectives including the channel spreading of the symbols incurred over the distance from the transmitter to the receiver, essentially inverting the de-emphasis process.

However, channel conditions can vary. Additionally, a de-emphasis transmission signal can have higher magnitude transitions that, in some channel and signal environments, may cause interference with other signal transmission, i.e., "crosstalk." To adapt to such changing conditions, de-emphasis filters can be configured to have multiple levels of de-emphasis. This has long posed a design conflict because conventional techniques for multi-level pre-emphasis generally prefer voltage mode drivers. However, both setting and maintaining a target impedance for voltage mode drivers can have particular design and performance costs.

SUMMARY

The following summary is not an extensive overview of all contemplated aspects, and is not intended to identify key or critical elements of all aspects nor delineate the scope of any embodiment or any aspect of any embodiment.

One example apparatus according to various exemplary embodiments may provide, among other features, novel distributing of current, and may include a current source configured to generate a total distribution current (TDC), in combination with a programmable current splitter configured to split TDC, in an apportionment according to a given distribution command, into a first control current, a second control current, and a third control current, and may further include a first current indicating circuit configured to generate a first control voltage indicative of the first control current, a second current indicating circuit configured to generate a second control voltage indicative of the second control current, and a third current indicating circuit configured to generate a third control voltage indicative of the third control current.

One example programmable current splitter, in an aspect according to various exemplary embodiments, may include a distribution node, coupled to the current source, for receiving TDC, in combination with a first programmable current sink coupled to the distribution node, a second programmable current sink coupled to the distribution node, in parallel with the first programmable current sink, and a remaining current branch coupled to the distribution node, parallel to the first programmable current sink and the second programmable current sink. In a further aspect, the programmable current splitter may be configured to program the first programmable current sink, according to the given distribution command, to sink the second control current as a first portion of TDC, and to program the second programmable current sink, according to the given distribution command, to the sink the third control current as a second portion of TDC.

In a related aspect, one example remaining current branch may be configured to carry the first control current from the distribution node, the first control current being a portion of TDC remaining from the first programmable current sink sinking the first portion of TDC and the second programmable current sink sinking the second portion of TDC.

In a further aspect, one example first current indicating circuit may be configured to generate the first control voltage in response to the first control current through the remaining current branch.

In another aspect, one example first current sink may be configured to switch to a first sink state when programmed according to the given distribution command to sink the second control current. In one further aspect, the second current indicating circuit may include a replica of the first programmable current sink, and the replica of the first programmable current sink may be programmable according to the given distribution command to a replica of the first sink state. In still another aspect, a current feed may couple the replica of the first programmable current sink to a power rail, and may be configured to feed a replica of the second control current in response to the replica of the first programmable current sink being in the replica of the first sink state, to generate the second control voltage in response to the replica of the second control current.

One example apparatus according to various exemplary embodiments may provide, among other features, novel selective de-emphasis in driving an embedded display port, distributing current, and may include a current source configured to generate a TDC, in combination with a programmable current splitter configured to split TDC, in an apportionment according to a given distribution command, into a first control current, a second control current, and a third control current, in further combination with a first current indicating circuit configured to generate a first control voltage based on the first control current, a second current indicating circuit configured to generate a second control voltage at a value corresponding to the second control current, and a third current indicating circuit configured to generate a third control voltage at a value corresponding to the third control current.

In an aspect, one example apparatus according to various exemplary embodiments may further include a main driver, a first post-tap de-emphasis driver, and a first post-tap de-emphasis driver. In a further aspect, the main driver may have a current source coupled to the first control voltage, and may be configured to receive an input signal and to output, in response, a non-emphasis signal on the embedded display port, the first post-tap de-emphasis driver may have a second current source coupled to the second control voltage, and may be configured to receive a first post-tap input signal and to output, in response, a first post-tap de-emphasis signal on the embedded display port, and the second post-tap de-emphasis driver may have a third current source coupled to the third control voltage, and may be configured to receive a second post-tap input signal and to output, in response, a second post-tap de-emphasis signal on the embedded display port.

One example method in accordance with one exemplary embodiment may provide, among other features, novel apportioning of contribution by a plurality of drivers in parallel, and may include generating a distribution current, receiving a distribution command, splitting the distribution current into a first control current, a second control current, and a third control current, in an apportionment according to the distribution command, wherein the third control current is a remaining portion of the distribution current splitting into the first control current and the second control current, in combination with generating a first control voltage in response to the third control current, generating a second control voltage indicative of the first control current, and generating a third control voltage indicative of the second control current.

In one aspect further to one exemplary embodiment, splitting the distribution current may include feeding the distribution current to a parallel arrangement of a first programmable current sink, a second programmable current sink, and a remaining current branch, in combination with programming the first programmable current sink and the second programmable current sink to sink, respectively, the first control current and the second control current from the distribution current.

In another aspect in accordance with an exemplary embodiment, splitting the distribution current may include flowing the remaining portion of the distribution current through the remaining current branch and, in another aspect, generating the first control voltage may include converting the third control current flowing through the remaining current branch into the first control voltage.

One example method in accordance with one exemplary embodiment may further include controlling a contribution of a first driver, a second driver and a third driver to an aggregate output based, at least in part, on the first control voltage, the second control voltage and the third control voltage, respectively. In an aspect, the first driver may be a main driver, the second driver may be a first post-tap de-emphasis driver receiving a first post-tap input signal, and the third driver may be a second post-tap de-emphasis driver receiving a second post-tap input signal.

In another aspect in accordance with one exemplary embodiment, programming the first programmable current sink may include programming the first programmable current sink to a first sink state, and generating the second control voltage may include programming a replica of the first programmable current sink to a replica of the first sink state, flowing a current through the replica of the first programmable current sink programmed in the replica of the first sink state, and converting the current into the second control voltage.

One example apparatus according to various exemplary embodiments may provide, among other features, novel apportioning of contribution by a plurality of drivers in parallel, and may include means for generating a distribution current, means for receiving a distribution command, means for splitting the distribution current into a first control current, a second control current, and a third control current, in an apportionment according to the distribution command, wherein the third control current may be a remaining portion of the distribution current splitting into the first control current and the second control current, in combination with means for generating a first control voltage in response to the third control current, means for generating a second control voltage indicative of the first control current, and means for generating a third control voltage indicative of the second control current.

One further example apparatus may include, in an aspect, means for transmitting a de-emphasis signal on an embedded display port at a de-emphasis based on the first control voltage, the second control voltage, and the third control voltage.

DETAILED DESCRIPTION

The detailed description set forth below in connection with the appended drawings is intended as a description of exemplary embodiments and is not intended to represent the only embodiments in which the present invention can be practiced. The word "exemplary" (and variants thereof) as used herein means serving as an example, instance, or illustration. Any aspect or design described herein as "exemplary" is not necessarily to be construed as preferred or advantageous over other aspects or designs. Rather, use of the word "exemplary" is only intended to illustrate example applications of concepts using simplified concrete examples.

Various specific details are also described, to facilitate a person of ordinary skill in the art in readily obtaining, through this disclosure in its entirety, a sufficient understanding of relevant concepts to practice according to one or more of the various exemplary embodiments. Such persons, though, upon reading this entire disclosure may see that various embodiments and aspects of one or more embodiments may be practiced without, or with alternatives to one or more of these specific details. In other instances, certain well-known structures and devices are shown in block diagram form to avoid obscuring the various novel ties of the exemplary embodiments.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

The terms "engine", "component", "module", "system", and the like, as used herein, are intended to refer to a functional entity, which may be embodied in hardware, firmware, a combination of hardware and software, software, or software in execution. A "component" may be, but is not limited to being, a process running on a processor, a processor, an object, an executable, a thread of execution, a program, and/or a computer. By way of illustration, both an application running on a computing device and the computing device can be a component.

The term "includes," as used in either the detailed description or the claims, is intended to be inclusive in a manner similar to the term "comprising," as "comprising" is interpreted when employed as a transitional word in a claim. The term "or," as used in either the detailed description or the claims, is intended to mean an inclusive "or" rather than an exclusive "or." In addition, the articles "a" and "an" as used in this disclosure should generally be construed to mean "one or more" unless specified otherwise or clear from the context to be directed to a singular form.

Figure 1:
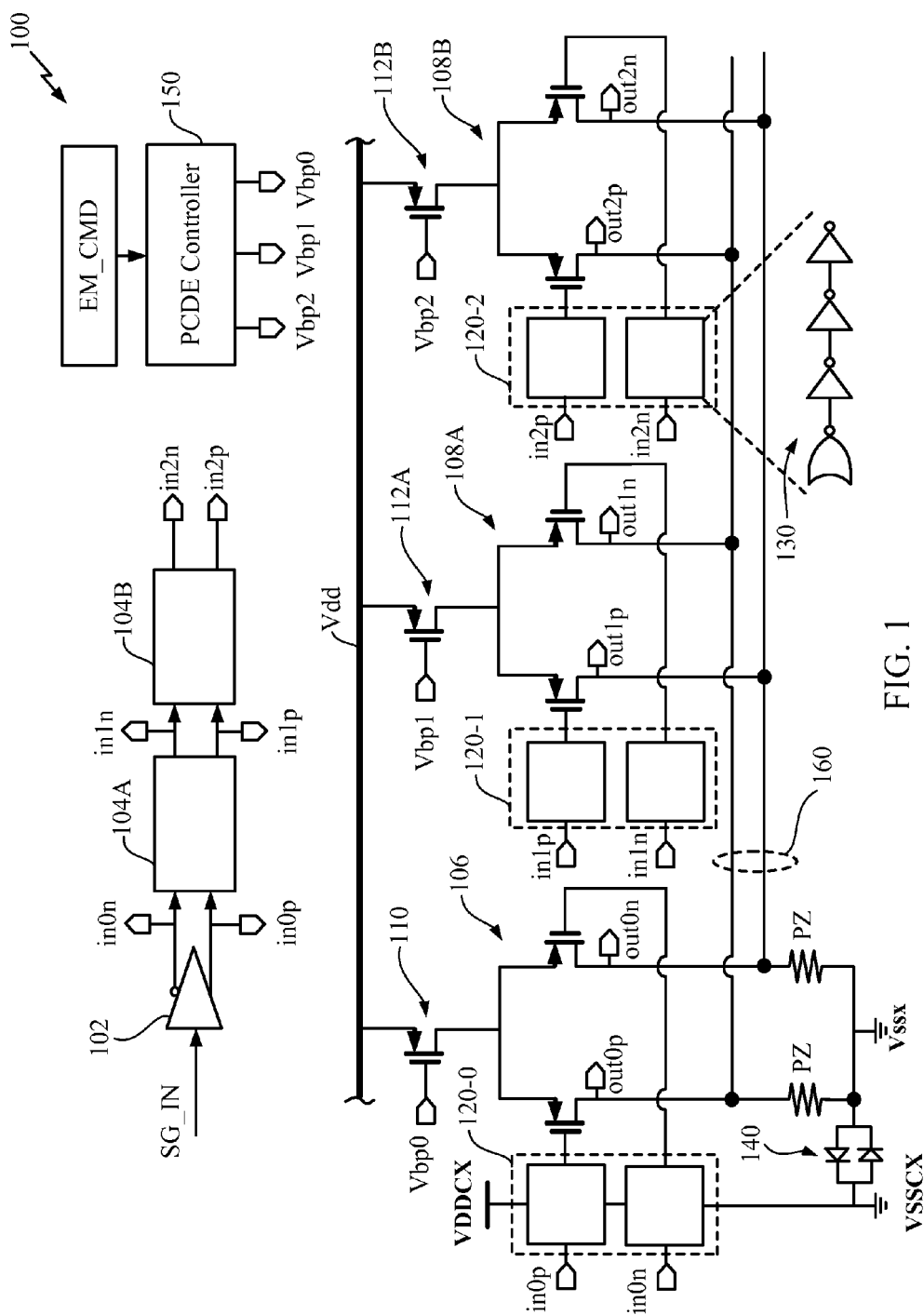
FIG. 1 shows a simplified schematic diagram of one voltage-driven multi-tap finite impulse response (FIR) de-emphasis filter.

FIG. 1 shows a high-level simplified schematic diagram of one voltage-driven, 3-tap finite-impulse response (FIR) de-emphasis filter 100 for transmitting to, or driving a transmission line 160. The transmission line 160 may be a port, for example, an Embedded DisplayPort or equivalent embedded display port. The 3-tap FIR de-emphasis filter 100 may provide for and/or accommodate an impedance in the transmission line 160, shown as a pair of lumped-parameter elements PZ. The three taps of the 3-tap FIR de-emphasis filter 100 may be implemented by a chain starting with buffer 102 or equivalent, which will be alternatively referenced as the "first tap 102," followed by second tap element 104A and third tap element 104B. An input signal, SG_IN, may be input to the first tap 102. SG_IN may be any symbol sequence. SG_IN is shown single-ended but may be differential. The output of the first tap 102 may be a differential signal, labeled in0p, in0n. The second tap element 104A and the third tap element 104B may apply an equal delay, arbitrarily referenced in this description as "T" (not explicitly labeled in the figures). The output of the second tap element 104A, labeled in1p, in1n, is in0p, in0n delayed by T. The output of the third tap element 104B, labeled in2p, in2n, is therefore in0p, in0n delayed by two tap delays, i.e., 2T. For brevity, "IN0" will collectively reference in0p and in0n. Likewise, "IN1" will collectively reference in1p and in1n, and "IN2" will collectively reference in2p and in2n. The value of T may be, but is not necessarily, one symbol period of SG_IN. The second tap element 104A and third tap element 104B may be implemented with conventional FIR delay techniques and, therefore, further detailed description is omitted.

It will be understood that various FIR configurations can assign any among IN0, N1, and IN2 to be the current symbol or "cursor." For purposes of consistency, this description assumes a convention in which IN0 is the non-emphasis input signal, i.e., the signal corresponding to the cursor. According to this convention, second tap element 104A forms a first "post-cursor" symbol and IN1 is a "first post-tap input signal," and third tap element 104B forms a second "post-cursor" symbol such that IN2 is a "second post-tap input signal." Therefore, in the above-described example convention, second tap element 104A may function as a first post-cursor tap and the third tap element 104B may function as a second post-cursor tap. It will be understood that this convention or configuration is only one example of several alternative conventions that may be assigned. For example, in one alternative configuration IN1 may be the cursor. Further to such alternative configuration, first tap 102 may carry a first "pre-cursor" symbol and the third tap element 104B may form a first "post-cursor" symbol.

The FIR coefficients, i.e., weights, may be applied to IN0, N1, and IN2 by a corresponding plurality of drivers, each providing a respectively weighted contribution to form an aggregate de-emphasis output, for example on a transmission line 160. Referring to FIG. 1, one example plurality of drivers may include a main driver 106, a first post-tap de-emphasis driver 108A, and a second post-tap de-emphasis driver 108B feeding the transmission line 160. In an aspect, the plurality of drivers 106, 108A, 108B may have respective pre-drivers, such as the main pre-driver 120-0, the first post-tap de-emphasis pre-driver 120-1, and the second post-tap de-emphasis pre-driver 120-2 (collectively referenced as "pre-drivers "120"). In the FIG. 1 example, the output of the main driver 106 is a non-emphasis signal (e.g., cursor signal), labeled "out0p" and "out0n." The output of the first post-tap de-emphasis driver 108A is a first post-tap de-emphasis signal, labeled "out1p" and "out1n." The output of the second post-tap de-emphasis driver 108B is a second post-tap de-emphasis signal, labeled "out2p" and "out2n."

Referring to FIG. 1, the 3-tap FIR de-emphasis filter 100 includes a particular example relation in the polarities of the coupling of the respective outputs (out0p, out0n, out1p, out1n, out2p, out2n) of the main driver 106, first post-tap de-emphasis driver 108A, and second post-tap de-emphasis driver 108B to the transmission line 160. The example relation is the outputs out1p, out1n of the first post-tap de-emphasis driver 108A being coupled to the transmission line 160 with a polarity opposite the polarity of the coupling to the transmission line 160 of the outputs out0p, out0n of the main driver 106 and the outputs out2p, out2n of the second post-tap de-emphasis main driver 108B. More particularly, according to the FIG. 1 configuration, the first post-tap de-emphasis driver 108A functions as a "negative" tap coefficient, while the main driver 106 and the second post-tap de-emphasis driver 108B function as "positive" tap coefficients. It will be understood "positive" and "negative" can mean opposite to one another, and assignment of which is "positive" and which is "negative" can be arbitrary. This is a known conventional technique for implementing tap addition and subtraction in FIR filters. It is only for illustration of applications, and is not intended to limit the scope of any embodiment. On the contrary, exemplary embodiments contemplate a plurality of drivers, e.g., the main driver 106, the first post-tap de-emphasis driver 108A, and the second post-tap de-emphasis driver 108B, coupled to a transmission line, e.g., the transmission line 160, with any arrangement in the polarity (or polarities) of their respective couplings.

Continuing to refer to FIG. 1, in an aspect, the main driver 106, first post-tap de-emphasis driver 108A, and second post-tap de-emphasis driver 108B may be implemented as respective voltage-controlled (VC) current mode (CM) or "VC/CM" drivers. The main driver 106 may have a first VC driver current source 110 controlled by a first control voltage Vbp0. The first post-tap de-emphasis driver 108A may have a second VC driver current source 112A controlled by a second control voltage Vbp1, and the second post-tap de-emphasis driver 108B may have a third VC driver current source 112B controlled by a third control voltage Vbp2. The main driver 106 therefore outputs the non-emphasis (i.e., cursor) signal, weighted as per Vbp0, the first post-tap de-emphasis driver 108A outputs a first post-tap de-emphasis signal, weighted as per Vbp1, and the second post-tap de-emphasis driver 108B outputs a second post-tap de-emphasis signal, weighted as per Vbp2. Stated differently, the relative values of Vbp0, Vbp1, and Vbp2 establish respective contribution from the main driver 106, the first post-tap de-emphasis driver 108A, and the second post-tap de-emphasis driver 108B to their aggregate output on the transmission line 160 and, therefore, establish the level of de-emphasis. The voltages Vbp0, Vbp1, and Vbp2 may therefore be referenced, in the context of FIG. 1, as the "main driver current control voltage" or "main driver control voltage" Vbp0, the "first post-tap de-emphasis control voltage" Vbp1, and the "second post-tap de-emphasis control voltage" Vbp2, respectively.

According to various exemplary embodiments, Vbp0, Vbp1, and Vbp2 are generated by programmable current-distribution de-emphasis (PCDE) controller 150. In one aspect, information referenced generally in this description by an arbitrarily selected label of "EM_CMD" can be provided to the PCDE controller 150, conveying information defining or sufficient to derive the relative values of Vbp0, Vbp1, and Vbp2. It will be understood that EM_CMD is not necessarily one particular signal. Instead, EM_CMD may reference a kind of information, namely information defining or sufficient to derive target values of Vbp0, Vbp1, and Vbp2. It will be understood that practices according to the embodiments are not limited to any particular means, method, protocol, or technology for EM_CMD generation, communication, or storage.

According to various exemplary embodiments, the PCDE controller 150 can include current-mode logic that can automatically control and provide the generation of Vbp0, Vbp1, and Vbp2 to maintain their sum, (and therefore the sum of the driver currents they control), at a constant value. Among various other benefits, this may provide for constant aggregate power output by the drivers controlled by Vbp0, Vbp1, and Vbp2, together with a ready control and updating in their respective weights or contributions. As a particular example, referring to FIG. 1, controlling generation of Vbp0, Vbp1, and Vbp2 to maintain their sum at a constant value can control the main driver 106, first post-tap de-emphasis driver 108A, and second post-tap de-emphasis driver 108B to obtain selective de-emphasis, at constant signal power. Referring to FIG. 1, other benefits that may be provided by systems and methods according to the exemplary embodiments may include, without limitation, pre-drivers 120-0, 120-1 and 120-2 formed of simple CMOS buffers such as the example CMOS buffers 130. Other example benefits may include the pre-drivers 120 working in VDDCX-VSSCX core power, for example 0.9 volts, with the main driver 106 and the first and second post-tap de-emphasis drivers 108A and 108B operating in a higher Vdd-Vssx I/O power, for example 1.8V. Still further among various benefits may be electro-static discharge (ESD) protection using simple back-to-back (B2B) diodes, such as the example B2B diodes 140 coupled to the transmission line 160.

Figure 2:
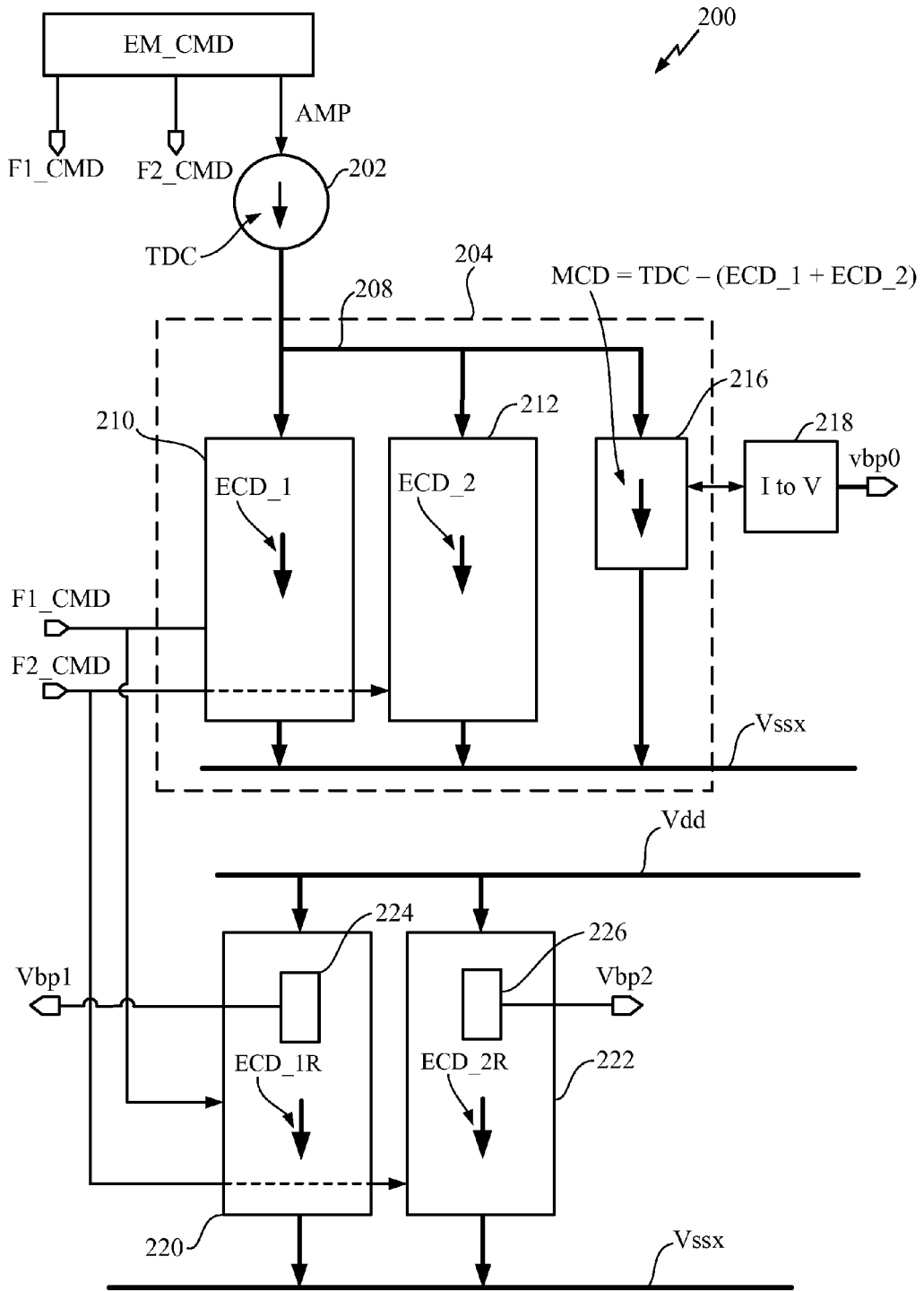
FIG. 2 shows one high-level logical topology of one programmable current-distribution based de-emphasis (PCDE) controller for voltage control of post-tap de-emphasis drivers in accordance with one exemplary embodiment.

FIG. 2 shows a high-level topology for one PCDE controller 200 in accordance with one or more exemplary embodiments, for implementing the FIG. 1 PCDE controller 150.

Referring to FIG. 2, PCDE controller 200 may include, in an aspect, a current source 202 for generating a total distribution current (TDC) and a programmable current splitter 204 for splitting TDC into a plurality of control currents according to a programmable apportionment. For brevity, the current source 202 will be alternatively referenced as "the TDC current source" 202. In an aspect, the TDC current source 202 may be programmable, i.e., may be configured to generate TDC at a programmable level.

In an aspect, the programmable current splitter 204 may include a distribution element or node 208 configured to receive TDC, and feed a plurality of current branches, such as first programmable current sink 210, second programmable current sink 212, and current branch 216. In a related aspect, the described plurality of current branches may go from the distribution element to the reference rail Vssx. In an aspect, the programmable current splitter 204 may perform programmable splitting of TDC among the parallel branches, for example, into a first control current, a second control current and a third control current, in an apportionment controlled by the program state of certain of the parallel branches, for example the first and second programmable current sinks 210 and 212. Further to this aspect, splitting according to a particular apportionment may be obtained by programming the first programmable current sink 210 into a specific state that sinks a specific first control current, labeled "ECD_1," and programming the second programmable current sink into a specific state that sinks a specific second control current, labeled "ECD_2."

Assuming the magnitude of TDC is known, e.g., programmed to a specific value, the programming of the first and second programmable current sinks 210 and 212 to obtain a specific ECD_1 and ECD_2 defines the third control current as the remaining portion of TDC, labeled "MCD." In an aspect, MCD flows from the distribution node 208 through the current branch 216. Description of operations and aspects pertaining to MCD will therefore alternatively reference the current branch 216 carrying MCD as the "remaining current branch" 216. Example programming of the first programmable current sink 210 and the second programmable current sink 212 will be described in greater detail at later sections.

Referring to FIG. 2, in accordance with various exemplary embodiments the PCDE controller 200 may include a generating of control signals, e.g., control voltages, using the above-described control currents formed by the programmable current splitter 204 splitting TDC. In an aspect, the PCDE controller 200 may include a first current indicating circuit 218 for generating a first control voltage based on, or indicative of MCD, i.e., the portion of TDC remaining after the first and second programmable current sinks 210 and 212 have taken their respective portions. One example first control voltage can be Vbp0 described in reference to FIG. 1. Referring to FIG. 2, the first current-indicating circuit 218 may be, for example, a current-to-voltage or other current detection circuit (details not explicitly shown in FIG. 2) in series with or otherwise coupled to the current branch 216.

According to another aspect, the PCDE controller 200 may include a first programmable replica current sink 220, which may be a replica of the first programmable current sink 210, and may include or be associated with a current-to-voltage circuit 224. The PCDE controller 200 further may include a second programmable replica current sink 222, which may be a replica of the second programmable current sink 212, and may include, or be associated with a current-to-voltage circuit 226. In an aspect, the first programmable replica current sink 220 and the second programmable replica current sink 222 may be arranged in parallel between a Vdd power rail and a Vssx power rail. The first programmable replica current sink 220 may be, in whole or in part, structurally identical to the first programmable current sink 210. Likewise, the second programmable replica current sink 222 may be, in whole or in part, structurally identical to the second programmable current sink 212. Further to this related aspect, the first programmable replica current sink 220 may be programmed to a replica of the state in which the first programmable current sink 210 sinks ECD_1. The first programmable replica current sink 220, programmed in the described replica of the state, will sink a sufficiently accurate replica first control current, labeled in FIG. 2 "ECD_1R." The first programmable replica current sink 220, in accordance with this aspect, may be programmed by, or based on the same F1_CMD used by the first programmable current sink 210 in establishing ECD_1. In a similar aspect, the second programmable replica current sink 222 may be structured such that, in response to being programmed to a replica of the state in which the second programmable current sink 212 sinks ECD_2, it will sink a sufficiently accurate replica second control current, labeled "ECD_2R." The second programmable replica current sink 222, in accordance with this aspect, may be programmed by, or based on the same F2_CMD used by the second programmable current sink 212 in establishing ECD_2.

As described previously the first programmable replica current sink 220 may include or be associated with the current-to-voltage circuit 224. The second programmable replica current sink 222 may likewise include or be associated with the current-to-voltage circuit 226. In an aspect, the current-to-voltage circuit 224 may generate the second control voltage Vbp1 based on, or in response to ECD_1R. Since ECD_1R is a replica of ECD_1, Vbp1 generated by the current-to-voltage circuit 224 indicates ECD_1. Therefore, for purposes of description, the combination of the first programmable replica current sink 220 and the current-to-voltage circuit 224 will be alternatively referenced, collectively, as the "second current indicating circuit 220/224. In a similar aspect, the current-to-voltage circuit 226 included in, or associated with the second programmable replica current sink may generate the second control voltage Vbp2 based on, or in response to ECD_1R. Since ECD_2R is a replica of ECD_2, Vbp2 generated by the current-to-voltage circuit 226 indicates ECD_2. Therefore, for purposes of description, the combination of the second programmable replica current sink and the current-to-voltage circuit 226 will be alternatively referenced, collectively, as the "third current indicating circuit 222/226.

It will be understood that, if TDC is held constant, changing the programming of the programmable current splitter 204 to vary the apportionment of TDC among ECD_1, ECD_2, and MCD will not change the sum of ECD_1, ECD_2, and MCD. Instead, their sum will remain at TDC. As will be appreciated by persons of ordinary skill in the art having view of this disclosure, generating Vbp0, Vbp1, and Vbp2 according to the described embodiments provides, among other benefits, an adjustability of apportionment among Vbp0, Vbp1, and Vbp2 that automatically maintains their sum at a constant value.

Referring to FIG. 2, example operations of the PCDE controller 200 in programming, or providing programming to the programmable current splitter 204 will now be described. According to one aspect, the PCDE controller 200 can receive, retrieve, or otherwise be provided with control data having information defining, or sufficient to identify respective program states of the first programmable current sink 210 and the second programmable current sink 212. It will be understood that the term "control data" is not intended to imply any particular format or technology, and is intended to include both continuous and discrete valued signals. With respect to information content of "control data," embodiments may include providing the PCDE controller 200 with a given distribution command or other control data identifying, directly or indirectly, a desired characteristic of devices, e.g., drivers controlled by the generated control voltages. For example, referring to FIGS. 1 and 2, embodiments may include providing the PCDE controller 200 with control data specifying a de-emphasis to be performed by the main driver 106, first post-tap de-emphasis driver 108A, and second post-tap de-emphasis driver 108B. In an aspect, the PCDE controller 200 may include logic (not explicitly shown in FIG. 2) for deriving a first program state for the first programmable current sink 210, and a second program state for the second programmable current sink 212 that, assuming the magnitude of TDC is known, will generate Vbp0, Vbp1, and Vbp2 corresponding to the specified de-emphasis. As another example, embodiments may include the PCDE controller 200 being configured to receive, or to be otherwise provided with, control data directly defining a first program state for the first programmable current sink 210, a second program state for the second programmable current sink 212, or both. Embodiments may also include the PCDE controller 200 being configured to receive, or to be otherwise provided with an amplitude or magnitude command for adjusting a magnitude of TDC.

Referring to FIG. 2, example operations will be described. The examples will assume, for purposes of avoiding description of complexities not necessary to understanding concepts, a given distribution command being received by, retrieved by, or otherwise provided to PCDE controller 200 that directly specifies program states of the first and second programmable current sinks 210 and 212, and directly specifies the magnitude of TDC. More particularly, the example assumes a distribution command having information, arbitrarily labeled F1_CMD and F2_CMD, directly specifying program states of the first and second programmable current sinks 210 and 212, respectively, and having information, arbitrarily labeled "AMP," directly specifying the magnitude of TDC. F1_CMD, F2_CMD, and AMP may be, for example, information carried by the above-described EM_CMD. FIG. 2 shows F1_CMD, F2_CMD, and AMP maintained in virtual registers (shown but not separately numbered), but it will be understood that the virtual registers do not necessarily represent any particular hardware. The virtual registers instead represent any means or technique to make available the F1_CMD, F2_CMD and AMP.

Assuming that F1_CMD, F2_CMD, and AMP are provided, operations may include programming the first programmable current sink 210 to a first sink state according to F1_CMD, and programming the second programmable current sink 212 to a second sink state according to F2_CMD. In an aspect, the TDC current source 202 may generate TDC based, at least in part, on AMP. It will also be understood that exemplary embodiments may omit command-type programmability of TDC. The programmable current splitter 204 may, in an apportionment based on the first sink state of the first programmable current sink 210 and the second sink state of the second programmable current sink 212, perform splitting of TDC into a first control current, e.g., ECD_1, a second control current, e.g., ECD_2, and a remaining or third control current, e.g., MCD. The apportionment (relative to a given magnitude of TDC) can be fully defined by F1_CMD, F2_CMD.

In an aspect, the first current indicating circuit 218 may generate the first control voltage Vbp0 based on MCD. Referring to FIG. 1, the first control voltage Vbp0 may be a main driver control voltage. With respect to generating the second control voltage Vbp1, in an aspect the PCDE controller 200 may have program the first programmable replica current sink 220 of the second current indicating circuit 220/224 using, or based on, the same F1_CMD used to program the first programmable current sink 210 to sink ECD_1. Assuming the first programmable replica current sink 220 is structured, at least in relevant part, substantially the same as the first programmable current sink 210, a replica of ECD_1, namely, ECD_1R, will flow through the first programmable replica current sink 220 of the second current indicating circuit 220/224. In an aspect, the current-to-voltage circuit 224 converts ECD_1R to Vbp1, the first post-tap de-emphasis control voltage for the FIG. 1 first post-tap de-emphasis driver 108A.

With respect to generating the third control voltage Vbp2, in an aspect the PCDE controller 200 may program the second programmable replica current sink 222 of the third current indicating circuit 222/226 using, or based on the same F2_CMD used to program the second programmable current sink 212 to sink ECD_2. Assuming the second programmable replica current sink 222 is structured, at least in relevant part, substantially the same as the second programmable current sink 212, a result will be a replica of ECD_2, namely, ECD_2R, flowing through the second programmable replica current sink 222. In an aspect, the current-to-voltage circuit 226 of the third current indicating circuit 222/226 converts ECD_2R to Vbp2, the second post-tap de-emphasis control voltage for the FIG. 1 second post-tap de-emphasis driver 108B.

Figure 3:
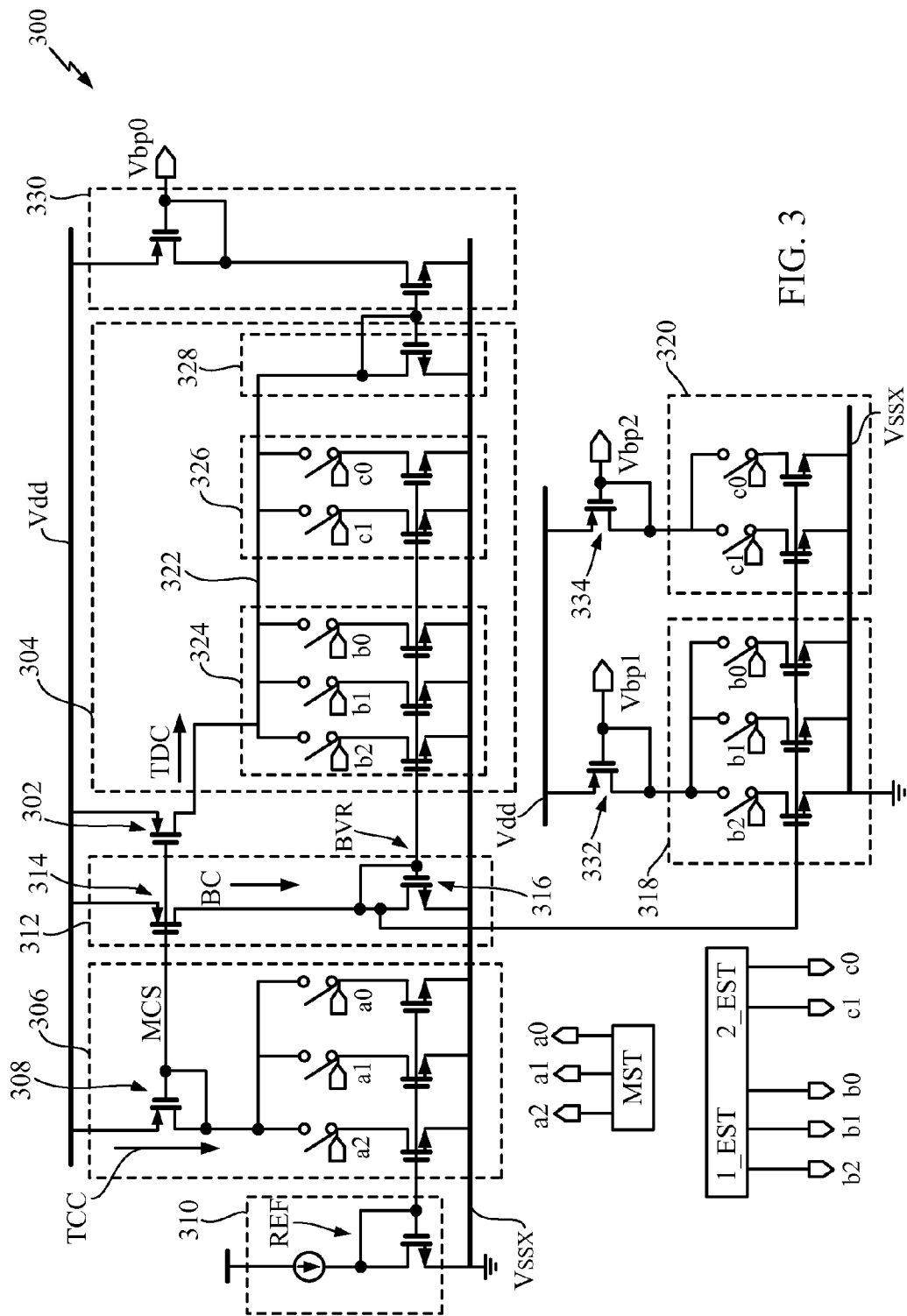
FIG. 3 shows one schematic diagram of one example PCDE controller in accordance with one exemplary embodiment

FIG. 3 shows a schematic diagram of one example PCDE controller 300 in accordance with one or more exemplary embodiments. Referring to FIG. 3, PCDE controller 300 may include current source 302 configured to generate the total distribution current, TDC as was previously described in reference to FIG. 2, coupled to a programmable current splitter 304. In describing various aspects, the current source 302 will be alternatively referenced as "the TDC current source" 302. The programmable current splitter 304 may implement or correspond to, for example, the programmable current splitter 204 of FIG. 2. In an aspect, the TDC current source 302 may be configured to be controllable by, for example, a TDC control voltage such as the voltage labeled "MCS." In a related aspect, the PCDE controller 300 may include a current source control circuit 306 configured to control the TDC current source 302. For convenience, the current source control circuit 306 will be alternatively referenced as the "TDC control circuit" 306. The TDC control circuit 306 may be configured to adjust, based on a provided amplitude or magnitude control data, arbitrarily labeled "MST," a magnitude of a control current through a current-to-voltage generating current feed 308, for example diode-connected PMOS device. For purposes of description, the diode-connected PMOS device example implementation of the current-to-voltage generating current feed 308 will be referenced in the alternative as the "diode-connected PMOS device 308." The control current will be referred to as a "TDC control current," or "TCC." MST may be, for example, the amplitude control data AMD described in reference to FIG. 2. In a related aspect, the TDC current source 302 may be configured as a mirror current source (e.g., a PMOS device structured similarly to the diode-connected PMOS device 308), and configured to receive the gate-source voltage of the diode-connected PMOS device 308 as the above-described TDC control voltage MCS.

Continuing to refer to FIG. 3, in a further aspect, the TDC control circuit 306 may be configured to adjust the magnitude of TCC according to MST by employing a plurality of parallel ON-OFF current sinks (shown in FIG. 3 but not separately numbered) from the diode-connected PMOS device 308 to a reference rail, for example Vssx. Each ON-OFF current sink of the TDC control circuit 306 may have an ON-OFF switch (shown but not separately numbered) in series with a current-establishing transistor, for example, an NMOS device, and the ON-OFF switches may be configured as individually controllable by MST.

Aspects of the TDC control circuit 306 will be described assuming, for MST, an example bit resolution of 3 bits, comprising a2, a1, and a0 controlling, respectively, a corresponding one of three ON-OFF current sinks. In an aspect, a2, a1, and a0 may be binary weighted values, i.e., a2=2*a1=4*a0, and MST configured as such is capable of representing seven equally spaced levels. It will be understood that a 3-bit resolution MST is only for purposes of example, as more or fewer bits may be used. Further to the aspect of a2, a1, and a0 having binary weights, each of the three ON-OFF current sinks of the TDC control circuit 306 may have a binary weighted ON current, established by its current-establishing NMOS device, corresponding to the binary weight of the respective one of a2, a1, and a0 that controls it. The TDC control circuit 306 may operate by, for example, a2, a1, a0 selecting different combinations of the ON-OFF current sinks, i.e., different combinations of the binary weighted ON currents. Their sum forms the TDC control current TCC. TCC is fed from Vdd through the above-described diode-connected PMOS device forming the TDC control current-to-voltage generating current feed 308. In accordance with conventional diode-connected PMOS device operation, the magnitude of TCC is reflected by the device's resulting gate/drain voltage, i.e., MCS.

Example structure and operation of the three ON-OFF current sinks of the TDC control circuit 306, respectively controlled by a2, a1, and a0 (for brevity, referenced collectively as the "a2-a0 ON-OFF current sinks") will now be described. Also for brevity, the a2-a0 ON-OFF current sinks will be individually referenced by the name of their controlling bit among a2, a1, and a0, i.e., the "a0" ON-OFF current sink, the "a1" ON-OFF current sink, and the "a2" ON-OFF current sink. Likewise, their respective ON currents will be referenced as the "a0 current," the "a1 current," and the "a2 current."

As previously described, each of the a2-a0 ON-OFF current sinks may be formed of an ON-OFF switch (shown but not separately numbered), controlled by one of a2, a1, a0, in series with a current-establishing NMOS device (shown but not separately numbered). For brevity, the respective current-establishing NMOS devices of the a2-a0 ON-OFF current sinks are hereinafter individually referenced as the "a2 NMOS device," the "a1 NMOS device," and the "a0 NMOS device" and, collectively, as "the a2-a1 NMOS devices." In an aspect, the a2-a0 NMOS devices may be maintained in an ON state by a reference voltage, or reference bias, arbitrarily labeled "REF," applied to their gates. REF may be provided by reference bias circuit 310, for example, a reference source (shown but not separately numbered) feeding an NMOS diode-connected device (shown but not separately numbered).

As previously described, a2, a1, and a0 may represent binary weighted bits, with a0 being the LSB, and a2 being the MSB. As also previously described, the a2-a0 ON-OFF current sinks may be configured to sink corresponding binary weighted ON currents. The relative values of the ON currents may be obtained by, for example, appropriate relative sizing of the current-establishing NMOS devices. For purposes of example, the a0 current can have a given or selected magnitude, arbitrarily referenced in this description as "Delta_A." With respect to the specific numeric value of Delta_A, this value may be a design choice and may be application specific, but can be readily determined for a specific application by persons of ordinary skill in the art having view of this disclosure, without undue experimentation. Selecting the numeric value of Delta_A may be performed in conjunction with selecting an appropriate REF value, and configuring the reference bias circuit 310 accordingly. For purposes of illustration, one non-limiting, arbitrary value of Delta_A is described in reference to Table 1 of this disclosure.

Continuing with the example above, in accordance with conventional binary weighting, the a1 ON-OFF current sink and the a0 ON-OFF current sink can be configured, respectively, to provide the a1 current with a magnitude of two times Delta_A, or 2*DeltaA. Persons of ordinary skill in the art, applying conventional techniques to the present disclosure, can readily select structure of the a1 NMOS device, relative to the structure of the a0 NMOS device, to provide this described relation of the a1 current being twice the a0 current. For example, such persons can readily select the size of the a1 NMOS device relative to the size of the a0 NMOS device so that the a1 NMOS device conducts twice as much current as the a0 NMOS device. Further detailed description of the structure selection is therefore omitted.

Continuing with the above-described example, in an aspect the a2 current can have magnitude four times Delta_A, or 4*Delta_A. As previously stated, persons of ordinary skill in the art, applying conventional techniques to the present disclosure, can readily select structure of the a2, a1, and a0 NMOS devices to provide this described relation of the a2 to a0 (and a1) current. For example, such persons can readily select the size of the a2 NMOS relative to the sizes of the a1 and a0 NMOS devices so that the a2 NMOS device conducts twice as much current as the a1 NMOS device and four times as much current as the a0 NMOS device. Further detailed description of the structure is therefore omitted.

For purposes of illustration, one example value for Delta_A may be Delta_A=10, and Table I below presents values of the a2 current, a1 current, and a0 current corresponding to Delta_A=10, which can be provided by, for example, appropriate relative sizing of the respective a2-a0 NMOS devices.

TABLE I

| a2 current | a1 current | a0 current |
|---|---|---|
| 40 | 20 | 10 |

A particular configuration of the FIG. 3 PCDE controller 300 including the above described Table I device values will be described in greater detail in reference to FIG. 4.

Referring to FIG. 3, as previously described, TCC flows from Vdd through the diode-connected PMOS device forming the TDC control current-to-voltage generating current feed 308, and the magnitude of TCC is reflected by the diode-connected PMOS device's resulting gate/drain voltage, i.e., MCS. In an aspect, the PCDE controller 300 may further include a mirror bias circuit 312 formed of a mirror current source or current mirror 314, for example a PMOS device, in series with current-to-voltage bias generator 316, for example a diode-connected NMOS device or equivalent. As will be appreciated by persons of ordinary skill in the art having view of this disclosure, the current mirror 314, configured as described, may generate a master bias current, arbitrarily labeled "BC," that may substantially mirror TCC. In an aspect, BC passes through the current-to-voltage bias generator 316. In a related aspect, the current-to-voltage bias generator 316 may be, for example, a diode-connected NMOS device structured identical to a corresponding diode-connected NMOS device (shown in FIG. 3 but not separately numbered) in the reference bias circuit 310. The current-to-voltage bias generator 316, structured identical to a corresponding diode-connected NMOS device in the reference bias circuit 310, can generate a bias voltage (arbitrarily labeled "BVR") that is a replica of REF. In an aspect, described in greater detail later in this disclosure, BVR is used to bias NMOS devices within the programmable current splitter 304, and within first programmable replica current sink circuit 318 and second programmable replica current sink circuit 320. For brevity, the first programmable replica current sink circuit 318 will be alternatively referenced as the "first programmable replica CSC" 318, and the second programmable replica current sink circuit 320 will be alternatively referenced as the "second programmable replica CSC" 320.

With continuing reference to FIG. 3, in an aspect the TDC current source 302 may be a mirror current source, structured substantially identical to the PMOS device forming the TDC control current-to-voltage generating current feed 308 feeding TCC. Therefore, by receiving MCS, the TDC current source 302 may generate TDC as a mirror of TCC. The programmable current splitter 304 receives TDC on distribution element or node 322 and then splits or distributes TDC through parallel paths or branches terminating at, for example, Vssx. One of the parallel branches may be first programmable current sink circuit 324. For brevity, the first programmable current sink circuit 324 will be alternatively referenced as the "first programmable CSC" 324. Another of the parallel branches may be second programmable CSC 326, and another of the branches may be current branch 328. As described in greater detail in later sections, programming the first and second programmable CSCs 324 and 326 to respective given states can fully define or establish the apportionment of TDC among each of the first and second programmable CSCs 324 and 326 and the current branch 328.

As can be appreciated, the sum of the currents passing through the above-described three branches from the distribution node 322 to Vssx is TDC, i.e., a constant, regardless of the apportionment. As described in greater detail at later sections, in an aspect the PCDE controller 300 includes circuitry that generates voltages Vbp0, Vbp1 and Vbp2, indicative of the respective current flowing through the three branches. Therefore, since sum of the currents passing through the three branches is a constant, namely TDC, the sum of the voltages Vbp0, Vbp1 and Vbp2 is constant, regardless of their apportionment.

Referring to FIG. 3, in one aspect, generation of voltage indicative of current through the current branch 328 may be provided, by a first current indicating circuit 330. The first current indicating circuit 330 may comprise, for example, a current mirror (shown but not separately numbered) coupled to the current branch 328, and fed by a current-to-voltage device (shown but not separately numbered), for example, a diode-connected PMOS device coupling the current mirror to Vdd. In an aspect, the voltage generated by the first current indicating circuit 330 may be the first control voltage Vbp0.

In another aspect, generation of voltage indicative of current through the first programmable CSC 324 may be provided by a first programmable replica CSC 318, in combination with a second current-to-voltage generating circuit 332. The second current-to-voltage generating circuit 332 may be, for example, a current-to-voltage generating current feed device in series with the first programmable replica CSC 318, for example, a diode-connected PMOS device (shown in FIG. 3 but not separately numbered) coupling the first programmable replica CSC 318 to Vdd. As later described in greater detail, the first programmable replica CSC 318 may be programmable to sink a replica of the current that the first programmable CSC 324 is programmed to sink. Further to this aspect, the voltage generated by the second current-to-voltage generating circuit 332 can be the second control voltage Vbp1, which is indicative of the current through the first programmable CSC 324. Therefore, for purposes of description, the combination of the first programmable replica CSC 318 and the second current-to-voltage generating circuit 332 will be alternatively referenced, collectively, as the "second current indicating circuit 318/332."

With continuing reference to FIG. 3, in another aspect, generation of voltage indicative of current through the second programmable CSC 326 may be provided by the above-mentioned second programmable replica CSC 320, in combination with a third current-to-voltage generating circuit 334. The third current-to-voltage generating circuit 334 may be, for example, a current-to-voltage generating device in series with the second programmable replica CSC 320, for example, a diode-connected PMOS device (shown in FIG. 3 but not separately numbered) coupling the second programmable replica CSC 320 to Vdd. As later described in greater detail, the second programmable replica CSC 320 may be programmable to sink a replica of the current the second programmable CSC 326 is programmed to sink. Further to this aspect, the voltage generated by the third current-to-voltage generating circuit 334 can be the third control voltage Vbp2, which is indicative of the current through the second programmable CSC 326. Therefore, the combination of the second programmable replica CSC 320 and the third current-to-voltage generating circuit 334 will be alternatively referenced, collectively, as the "third current indicating circuit 320/334."

In an aspect, command signals may be applied to each of the first and second programmable CSCs 324 and 326 and to their corresponding first and second programmable replica CSCs 318 and 320. For example, a command signal, arbitrarily labeled "1_EST," can be provided to the first programmable CSC 324 and to its corresponding first programmable replica CSC 318. Similarly, another command signal, arbitrarily labeled "2_EST," can be provided to the second programmable CSC 326 and to its corresponding second programmable replica CSC 320. FIG. 3 shows 1_EST and 2_EST as maintained in a virtual register (shown but not separately numbered). It will be understood that the FIG. 3 virtual register does not necessarily represent any particular hardware or resource. The virtual register instead represents any means or technique to maintain and provide 1_EST and 2_EST information to the PCDE controller 300. In one example, 1_EST and 2_EST information may be included in a command information, such as EM_CMD discussed previously.

The example bit resolution of 1_EST used for this description is 3 bits, for example b2, b1, and b0. The example bit resolution of 2_EST is 2 bits, for example c1 and c0. It will be understood that these bit resolutions are only examples, and do not limit practices to any specific bit resolution. In an aspect, b2, b1, and b0 can represent weighted values, for example, b0 being a least significant bit and b2 being a most significant bit, as previously described for a2, a1, and a0.

Corresponding to 1_EST having an example bit resolution of 3 bits, the first programmable CSC 324 can be implemented by, for example, a parallel set of three ON-OFF individually switched current sinks, hereinafter collectively referenced as "b2-b0 ON-OFF current sinks." The b2-b0 ON-OFF current sinks are referenced individually as the "b2" ON-OFF current sink, the "b1" ON-OFF current sink, and the "b0" ON-OFF current sink. Likewise, the ON currents of the b2-b0 ON-OFF current sinks are referenced individually as the "b2 current," the "b1 current", and the "b0 current."

Each of the b2-b0 ON-OFF current sinks may be an ON-OFF switch (shown in FIG. 3 but not separately numbered), controlled by a particular one of the 1_EST bits, i.e., one of b2, b1, and b0, in series with an NMOS device. The NMOS devices may be structured differently from one another, to provide the b2-b0 ON-OFF current sinks with a respective binary weighted ON current corresponding to the binary weight of their controlling bits among b2, b1, and b0. Each of the b2-b0 NMOS devices may be biased by the above-described BVR, which, in accordance with an aspect, can substantially duplicate the REF bias applied to the corresponding NMOS devices of the TDC control circuit 306.

Referring to FIG. 3, the b0 current has a given magnitude, referenced herein as "Delta_B." The numeric value of Delta_B can be design choice and can be application specific, but can be readily determined for a specific application by persons of ordinary skill in the art having view of the present disclosure, without undue experimentation. Assuming a conventional binary weighting scheme, the b1 current can have a magnitude two times Delta_B, or 2*Delta_B. Persons of ordinary skill in the art, applying conventional techniques to the present disclosure, can readily select structure of the relevant NMOS or equivalent devices to provide this relation of the b1 current to the b0 current. For example, such persons can select the size of the NMOS device of the b1 ON-OFF current sink relative to the size of the NMOS device of the b0 ON-OFF current sink so that the b1 NMOS device conducts twice as much current as the b0 NMOS device). Further detailed description of such structure is therefore omitted. Continuing with the assumption of a conventional binary weighting scheme, the b2 current can have a magnitude two times the b1 current, i.e., in this example the b2 current can be four times Delta_B, or 4*DeltaB. Persons of ordinary skill in the art, applying conventional techniques to the present disclosure, can readily select structure of the relevant NMOS or equivalent devices to provide this relation of the b2 current to the b1 and b0 current. As an illustration, such persons may select the size of the b2 NMOS device relative to the respective sizes of the b0 NMOS device and the b1 NMOS device so that the b2 NMOS device conducts twice as much current as the b1 NMOS device, and four times as much current as the b0 NMOS device. Further detailed description of such structure is therefore omitted.

For purposes of illustration, one example value for Delta_B may be Delta_B=5, and Table II below presents values of the b2 current, b1 current, and b0 current corresponding to Delta_B=5, all of which can be provided by, for example, appropriate relative sizing of the respective b2-b0 NMOS devices.

TABLE II

| b2 current | b1 current | b0 current |
|---|---|---|
| 20 | 10 | 5 |

A particular configuration of the FIG. 3 PCDE controller 300, having for example the above-described Table II current (and NMOS device) values will be described in greater detail in reference to FIG. 4.

As previously presented in this disclosure, the example bit resolution of 2_EST is 2 bits, comprising c1 and c0. The c1 and c0 bits can represent weighted values, for example, c1 being twice the value of c0. Corresponding to the 2_EST bit resolution of 2 bits, the second programmable CSC 326 can be implemented by a parallel set of 2 ON-OFF individually switched current sinks (collectively the "c1-c0 ON-OFF current sinks") controlled, respectively, by a particular one of the 2_EST bits, i.e., one of c1 and c0. Each of the c1-c0 ON-OFF current sinks comprises, like the b2-b0 ON-OFF current sinks, an ON-OFF switch in series with a current-establishing NMOS device. The gates of the current-establishing NMOS devices are biased by BVR. The ON current of the "c1" ON-OFF current sink is referenced as the "c1 current," and the ON current of the "c0" ON-OFF current sink is referenced as the "c0 current."

In an aspect, the c0 current has a magnitude of "Delta_C." The numeric value of Delta_C can be design choice and can be application specific, but can be readily determined for a specific application by persons of ordinary skill in the art having view of the present disclosure, without undue experimentation. It will be understood that Delta_C and Delta_B are not necessarily equal. Therefore, the smallest step of adjusting the current through the first programmable CSC 324 may differ from the smallest step of adjusting the current through the second programmable CSC 326. According to conventional binary weighting, the c1 current may be twice the c0 current, i.e., 2*Delta_C. Persons of ordinary skill in the art, applying conventional techniques to the present disclosure, can readily select structure of the relevant NMOS devices to provide this relation of the c1 current to the c0 current. For example, such persons can select the size of the c1 NMOS device relative to the size of the c0 NMOS device so that the c1 NMOS device conducts twice as much current as the c0 NMOS device). Further detailed description is therefore omitted.

For purposes of illustration, one example value for Delta_C may be Delta_C=3, and Table III below presents values of the c1 current and c0 current corresponding to Delta_C=3, all of which can be provided by, for example, appropriate relative sizing of the respective c1-c0 NMOS devices.

TABLE III

| c1 current | c0 current |
|---|---|
| 6 | 3 |

A particular configuration of the FIG. 3 PCDE controller 300, having for example the above-described Table III current (and NMOS device) values will be described in greater detail in reference to FIG. 4.

Referring to FIG. 3, in an aspect the first programmable replica CSC 318 can be a structural duplicate of the first programmable CSC 324, and the two circuits 318 and 324 can be controlled in unison by b2, b1, b0. In a similar aspect, the second programmable replica CSC 320 can be a structural duplicate of the second programmable CSC 326, and the two circuits 320 and 326 can be controlled in unison by c1, c0.

Figure 4:
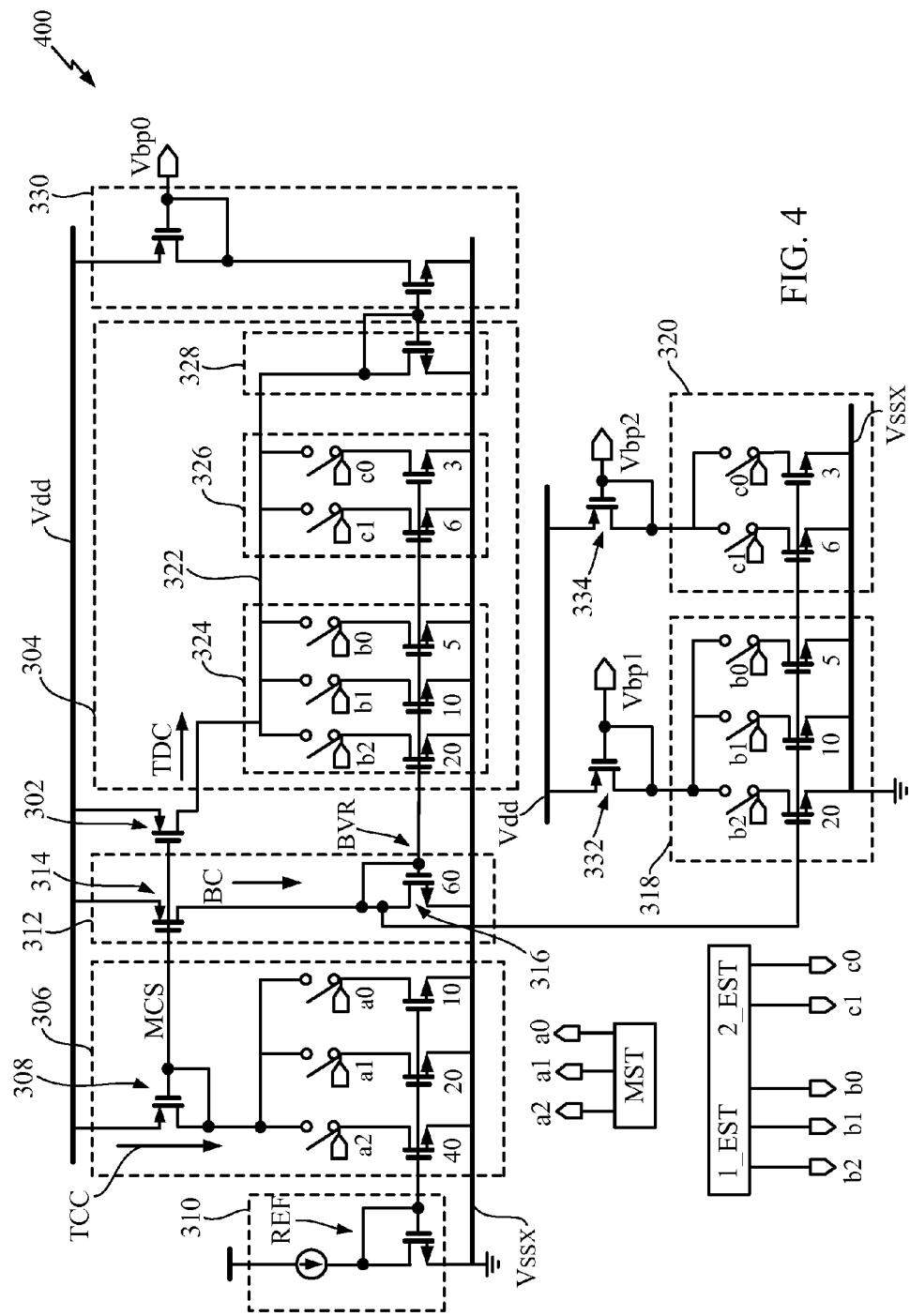
FIG. 4 shows the FIG. 3 example PCDE controller configured with example component values.

FIG. 4 shows one example of one particular configuration 400 of the FIG. 3 PCDE controller 300, having the above-described Table I, II, and III currents and corresponding NMOS device values for the various described programmable current sinks, and having example parameters and operating currents for other of the described circuitry.

Referring to FIG. 4, the configuration 400 includes the a0, a1, and a2 NMOS devices having relative binary weighted values of 10, 20 and 40, respectively. The NMOS device of the current-to-voltage bias generator 316 of the mirror bias circuit 312 has a value of 60. The b0, b1, and b2 NMOS devices of the first programmable CSC 324, and corresponding NMOS devices of the first programmable replica CSC 318, have relative binary weighted values of 5, 10, and 20, respectively. The c0 and c1 NMOS devices of the second programmable CSC 326, and corresponding NMOS devices of the second programmable replica CSC 320, have relative binary weighted values of 3 and 6, respectively. As can be understood, setting all of a0, a1, a2, b0, b1, b2, c0, and c1 to a high or "1" value closes all of the ON-OFF switches. The TCC current is therefore 10+20+40, which equals 70. Since the NMOS device 316 of the current-to-voltage bias generator 316 of the mirror bias circuit 312 has a value of 60, the mirror current BC is 60. This generates BVR at approximately the same voltage as REF. Since the TDC current source 302 generates TDC, based on MCS, as a mirror of TCC, TDC is 70. The current through the first programmable CSC 324 is therefore 5+10+20, which equals 35. The current through the second programmable CSC 326 is 3+6, which equals 9. The total of the current taken from TDC by the first and second programmable CSCs 324 and 326 is therefore 44. The current through the current branch 328 is therefore 26. If c1 and c0 are changed to 0 (not explicitly shown on FIG. 4), the first control current, meaning the control current sank by the first programmable CSC 324, remains at 35. However, since no current passes through the second programmable CSC 326, the total of the current taken from TDC by the first and second programmable CSCs 324 and 326 is now 35 instead of 44. The current through the current branch 328 therefore increases to 35. The total of the first, the second, and the third control currents, though, remains at 70.

Figure 5:
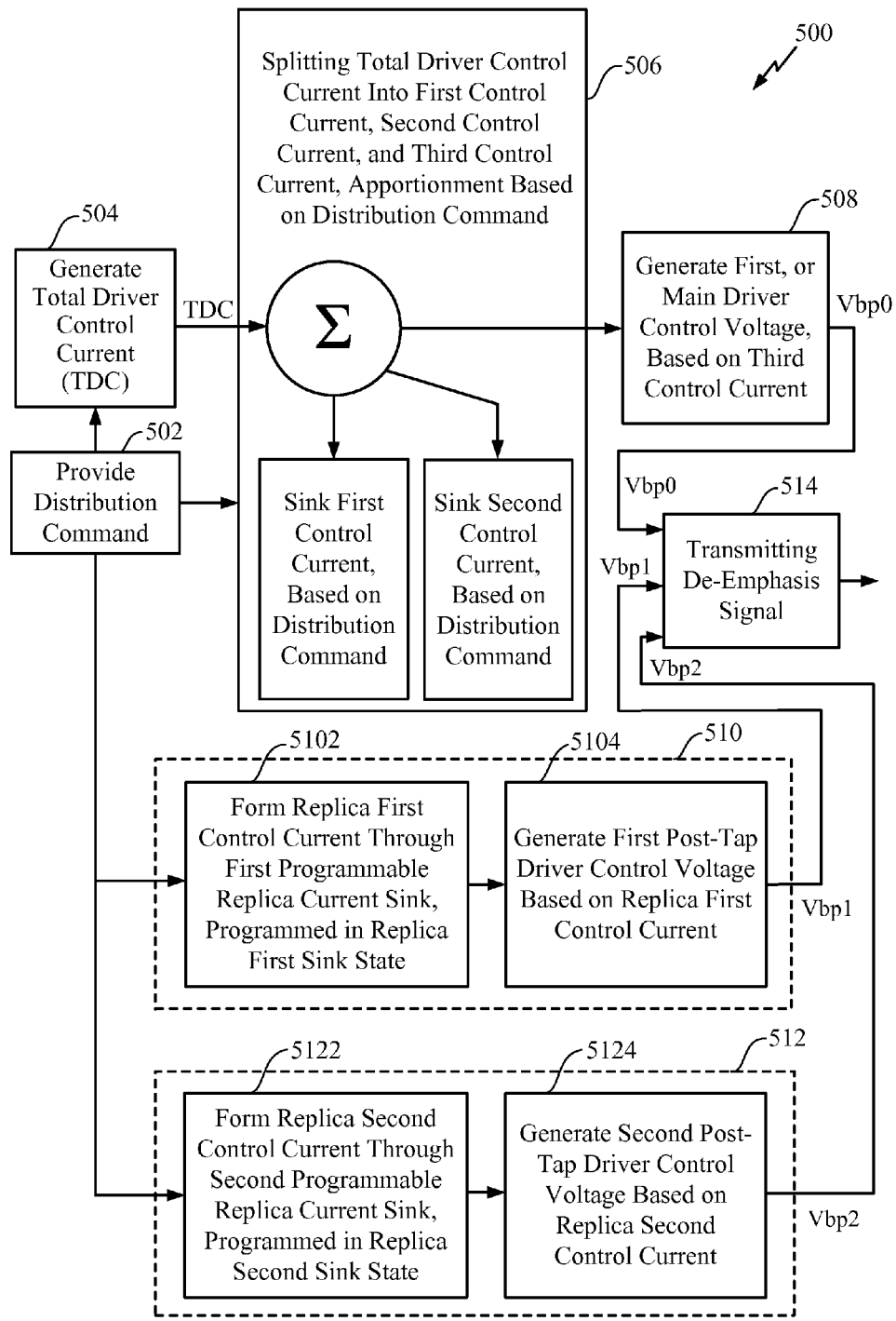
FIG. 5 shows one high level flow diagram of example processes for PCDE apportioning of contribution by drivers in accordance with one or more exemplary embodiments.

FIG. 5 shows one high level flow diagram of one example process 500 for PCDE voltage control of post-tap de-emphasis drivers in accordance with one or more exemplary embodiments.

Referring to FIG. 5, one example operation according to process 500 may include providing at 502 a distribution command data. The providing at 502 may be performed, for example, by providing, retrieving, receiving, or otherwise making available to a controller, such as the FIG. 2 PCDE controller 200, or FIG. 3 PCDE controller 300, information defining or sufficient to derive an apportionment for splitting at 506 of a distribution current generated at 504. In an aspect, the distribution command data or information may directly define parameters for the splitting, for example, by defining programming states for one or both of the FIG. 2 first and second programmable current sinks 210 and 212, or for one or both of the FIG. 3 first and second programmable CSCs 324 and 326. In another aspect, the distribution command data or information may include information sufficient for a controller, for example, the FIG. 2 PCDE controller 200 or FIG. 3 PCDE controller 300, to derive such parameters. In an aspect, the providing at 502 may also include information defining or setting a magnitude of the generated distribution current at 504. As previously described, one or more embodiments may include replica circuits, such as the FIG. 2 first and second programmable replica current sinks 220 and 222, or the FIG. 3 first and second programmable replica CSCs 318 and 320, and these may be configured with information provided at 502.

Continuing with example operations according to process 500, after 502 a distribution current may be generated at 504. The generating may be performed, for example, by a current source configured as shown by the FIG. 2 TDC current source 202, or as shown by the FIG. 3 TDC current source 302. In an aspect, the generating at 504 may include selecting, or otherwise controlling the magnitude of the distribution current, for example using information provided at 502. Such selecting or controlling may be performed by, for example, a resource configured such as the FIG. 3 TDC control circuit 306.

With continuing reference to FIG. 5, example operations according to process 500 may include splitting at 506 of the distribution current generated at 504, into a first, second, and third control current, in an apportionment of according to the distribution command data provided at 502. The splitting at 506 may include programming one or more of respective parallel branches to carry a desired level of the first control current and the second control current, which in turn can establish the third control current as a remaining portion of the distribution current. Means for splitting at 506 may include feeding the distribution current to a distribution node, in turn feeding programmable current sinks. For example, one means for splitting the distribution current at 506 may be a distribution node such as the FIG. 2 distribution node 208, feeding a parallel arrangement of programmable current sinks such as the first and second programmable current sinks 210 and 212, programmed to a first sink state and a second sink state, respectively. The programming may be according to the distribution command data provided at 502. Another means for splitting at 506 may be a distribution node such as the FIG. 3 distribution node 322, feeding programmable current sink circuits such as the FIG. 3 first and second programmable CSCs 324 and 326, programmed according to distribution command data provided at 502.

Continuing with example operations according to process 500, aspects may include a generating at 508 of a first control voltage based on the third control current. In aspects, the first control voltage may be a main driver (i.e., non-emphasis) control voltage, for example, Vbp0 controlling the FIG. 1 main driver 106.

In an aspect, example operations according to process 500 may include generating, at 510, a second control voltage indicative of the first control current produced by the splitting at 506. In a further aspect, generating the second control voltage may include generating a replica at 5102 of the first control current, as opposed to directly detecting the first control current, and then at 5104 generating the second control voltage based on the replica of the first control current. The generating at 5102 of the replica of the first control current, and generating at 5104 of the second control voltage based on that replica may be performed by, for example, by the FIG. 2 second current indicating circuit 220/224, or by the FIG. 3 second current indicating circuit 318/332. Referring to FIGS. 1 and 5, the second control voltage generated at 5104 may be the first post-tap de-emphasis control voltage Vbp1, controlling the first post-tap de-emphasis driver 108A.

In another aspect, example operations according to process 500 may include generating at 512 a third control voltage indicative of the second control current produced by the splitting at 506. In a further aspect, generating the third control voltage at 512 may include generating a replica at 5122 of the second control current, as opposed to directly detecting the second control current, and then at 5124 generating the third control voltage based on the replica of the second control current. The generating at 5122 of the replica of the second control current, and generating at 5124 of the third control voltage based on that replica may be performed by, for example, by the FIG. 2 third current indicating circuit 222/226, or by the FIG. 3 third current indicating circuit 320/334. Referring to FIGS. 1 and 5, the third control voltage generated at 5124 may be the second post-tap de-emphasis control voltage Vbp2 controlling the second post-tap de-emphasis driver 108B.

Methods in accordance with one or more exemplary embodiments may further include transmitting a de-emphasis signal, at 514, based on the first, second and the control voltages Vbp2, Vbp1 and Vbp0. Referring to FIGS. 1 and 5, example means for transmitting a de-emphasis signal may include controlling the main driver 106 with Vbp0 generated at 508, and controlling the first and second post-tap de-emphasis drivers 108A and 108B with Vbp1 and Vbp2, respectively, generated at 5014 and 5124.

Figure 6:
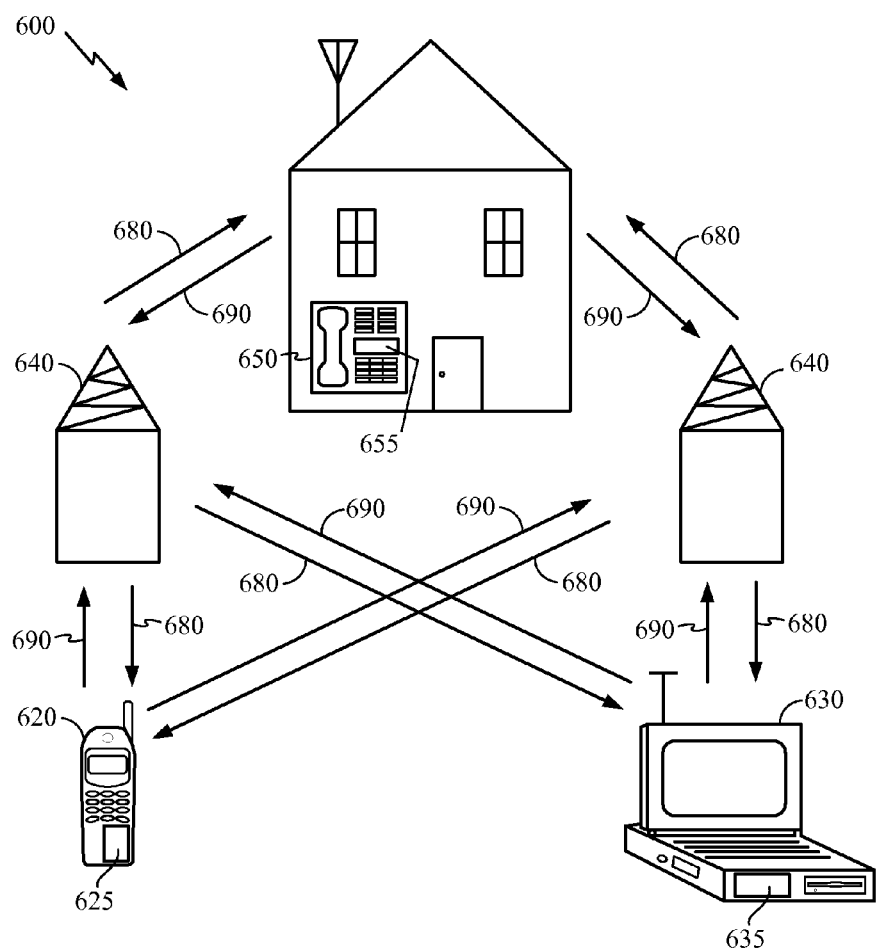
FIG. 6 illustrates one wireless communication system in which one or more embodiments of PCDE control of drivers in accordance with the disclosure may be advantageously employed.

FIG. 6 illustrates an exemplary wireless communication system 600 in which one or more embodiments of the disclosure may be advantageously employed. For purposes of illustration, FIG. 6 shows three remote units 620, 630, and 650 and two base stations 640. It will be recognized that conventional wireless communication systems may have many more remote units and base stations. The remote units 620, 630, and 650 include semiconductor devices 625, 635 and 655 (including on-chip voltage regulators, as disclosed herein), which are among embodiments of the disclosure as discussed further below. FIG. 6 shows forward link signals 680 from the base stations 640 to the remote units 620, 630, and 650 and reverse link signals 690 from the remote units 620, 630, and 650 to the base stations 640.

In FIG. 6, the remote unit 620 is shown as a mobile telephone, the remote unit 630 is shown as a portable computer, and the remote unit 650 is shown as a fixed location remote unit in a wireless local loop system. For example, the remote unit 650 may be one or more of a mobile phone, hand-held personal communication systems (PCS) unit, portable data units such as a personal data assistant, navigation devices (such as GPS enabled devices), set top box, music player, video player, entertainment unit, fixed location data unit such as a meter reading equipment, or any other device that stores or retrieves data or computer instructions, or any combination thereof. Although FIG. 6 illustrates remote units according to the teachings of the disclosure, the disclosure is not limited to these exemplary illustrated units. Embodiments of the disclosure may be suitably employed in any device that includes at least one semiconductor die having active integrated circuitry including memory and on-chip circuitry for test and characterization.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram. Further, the various methods disclosed herein can include employing a processor executing computer executable instructions stored on a computer readable storage medium to implement the methods.

It will be appreciated that data store (e.g., memories) components described herein may include or may be implemented using volatile memory, nonvolatile memory, or both. Nonvolatile memory may include or may be implemented with any non-volatile memory technology capable of meeting performance requirements pertaining to the particular memory function implemented, which can be readily ascertained by persons of ordinary skill in the art upon reading this disclosure, and may include, as illustrative but limitative examples, read only memory (ROM), programmable ROM (PROM), electrically programmable ROM (EPROM), electrically erasable ROM (EEPROM), or flash memory. Volatile memory may include or may be implemented with any volatile memory technology capable of meeting performance requirements pertaining to the particular memory function implemented, which can be readily ascertained by persons of ordinary skill in the art upon reading this disclosure, and may include, as illustrative but limitative examples, synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the various aspects is intended to comprise, without being limited to, these and any other suitable types of memory.

It is to be understood that aspects described herein may be implemented by hardware, software, firmware or any combination thereof. When implemented in software, functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. In addition, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to tangible media such as magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for generating control voltages, comprising:
   a current source configured to generate a total distribution current (TDC) from a power rail, the power rail not being a ground power rail;
   a programmable current splitter configured to split the TDC, in an apportionment according to a given distribution command, into a first control current, a second control current, and a third control current, and to vary the apportionment of the TDC in response to a change in the given distribution command;
   circuitry configured to generate a first control voltage, a second control voltage, and a third control voltage, indicative, respectively, of the the first control current, the second control current, and the third control current, the circuitry including:
      a first current-to-voltage device coupled directly to the power rail and configured to generate the first control voltage indicative of the first control current;
      a second current-to-voltage device coupled directly to the power rail and configured to generate the second control voltage indicative of the second control current; and
      a third current-to-voltage device coupled directly to the power rail and configured to generate the third control voltage indicative of the third control current.

2. The apparatus of claim 1, wherein the programmable current splitter comprises:
   a distribution node, coupled to the current source, for receiving the TDC;
   a first programmable current sink coupled to the distribution node;
   a second programmable current sink coupled to the distribution node and in parallel with the first programmable current sink;
   a remaining current branch coupled to the distribution node and in parallel with the first programmable current sink and the second programmable current sink; and
   the programmable current splitter is further configured to:
      program, based on the given distribution command, the first programmable current sink to sink the first control current as a first portion of the TDC; and
      program, based on the given distribution command, the second programmable current sink to sink the second control current as a second portion of the TDC.

3. The apparatus of claim 2, wherein the remaining current branch is configured to carry the third control current from the distribution node, the third control current being a portion of the TDC remaining from the first programmable current sink sinking the first portion of the TDC and the second programmable current sink sinking the second portion of the TDC.

4. The apparatus of claim 2, wherein the first programmable current sink is configured to switch to a first sink state when programmed according to the given distribution command to sink the first control current and the apparatus further comprises:
   a replica of the first programmable current sink that is programmable according to the given distribution command to a replica of the first sink state; and
   a current feed coupling the replica of the first programmable current sink to the power rail, configured to feed a replica of the first control current in response to the replica of the first programmable current sink being in the replica of the first sink state, and to generate the first control voltage in response to the replica of the first control current.

5. The apparatus of claim 4, wherein the second programmable current sink is configured to switch to a second sink state when programmed according to the given distribution command to sink the second control current and the apparatus further comprises:
   a replica of the second programmable current sink that is programmable according to the given distribution command to a replica of the second sink state; and
   another current feed coupling the replica of the second programmable current sink to the power rail, configured to feed a replica of the second control current in response to the replica of the second current sink being in the replica of the second sink state, and to generate the second control voltage in response to the replica of the second control current.

6. The apparatus of claim 2, wherein:
   the first programmable current sink comprises a first set of at least two parallel ON-OFF current sinks that are individually controllable; and
   the second programmable current sink comprises a second set of at least two parallel ON-OFF current sinks that are individually controllable.

7. The apparatus of claim 6, wherein the apparatus further comprises:
   a programmable replica current sink that includes a replica set of parallel individually controllable current sinks; and
   a current feed coupling the programmable replica current sink to the power rail via the first or the second current-to-voltage device, the first or the second current-to-voltage generating device configured to generate the first or the second control voltage, respectively, in response to a current of the programmable replica current sink.

8. The apparatus of claim 7, wherein the first or the second programmable current sink and the programmable replica current sink are configured to receive at least a portion of the distribution command.

9. The apparatus of claim 1, wherein the first, second, or third current-to-voltage device includes a diode connected P-channel metal-oxide-semiconductor field-effect transistor.

10. The apparatus of claim 1, wherein the current source comprises:
    a current source control circuit configured to:
       receive a reference voltage and magnitude control data;
       generate a TDC control current at a magnitude in accordance with the magnitude control data and the reference voltage;
       generate a TDC control voltage corresponding to the TDC control current; and
    a mirror current source coupled to the TDC control voltage and configured to generate, based on the TDC control voltage, the TDC as a mirror of the TDC control current.

11. The apparatus of claim 10, wherein the current source control circuit comprises:
    a plurality of parallel ON-OFF current sinks, at least two of the ON-OFF current sinks having an ON-OFF switch in series with a current-establishing transistor biased by the reference voltage, the ON-OFF switch controlled by the magnitude control data; and
    a current feed coupling the plurality of parallel ON-OFF current sinks to the power rail, the current feed comprising a current-to-voltage circuit configured to generate the TDC control voltage in response to a current to one or more of the parallel ON-OFF current sinks.

12. The apparatus of claim 1, wherein the apparatus is integrated in at least one semiconductor die.

13. The apparatus of claim 1, wherein the apparatus is embodied in whole or part as a set top box, music player, video player, entertainment unit, navigation device, communications device, personal digital assistant (PDA), fixed location data unit, or a computer.

14. The apparatus of claim 1, wherein the first current-to-voltage device is further configured to:
sink, concurrently with the first control current and in accordance with the distribution command, a replica of the first control current; and
convert the replica of the first control current to the first control voltage.

15. An apparatus for selective de-emphasis driving an embedded display port, comprising:
a current source configured to generate a total distribution current (TDC) from a power rail, the power rail not being a ground power rail;
a programmable current splitter configured to split, in an apportionment according to a given distribution command, the TDC into a first control current, a second control current, and a third control current, and to vary the apportionment in response to a change in the given distribution command;
circuitry configured to generate a first control voltage, a second control voltage, and a third control voltage, indicative, respectively, of the first control current, the second control current, and the third control current, the circuitry including:
a first current-to-voltage device coupled directly to the power rail and configured to generate a first control voltage at a value corresponding to the first control current;
a second current-to-voltage device coupled directly to the power rail and configured to generate a second control voltage at a value corresponding to the second control current;
a third current-to-voltage device coupled directly to the power rail and configured to generate a third control voltage at a value corresponding to the third control current;
a main driver having a current source coupled to the third control voltage and configured to receive an input signal and to output, in response, a non-emphasis signal on the embedded display port;
a first post-tap de-emphasis driver having a second current source coupled to the first control voltage and configured to receive a first post-tap input signal and to output, in response, a first post-tap de-emphasis signal on the embedded display port; and
a second post-tap de-emphasis driver having a third current source coupled to the second control voltage and configured to receive a second post-tap input signal and to output, in response, a second post-tap de-emphasis signal on the embedded display port.

16. The apparatus of claim 15, wherein the programmable current splitter comprises:
a distribution node coupled to the current source for receiving the TDC;
a first programmable current sink coupled to the distribution node;
a second programmable current sink coupled to the distribution node and in parallel with the first programmable current sink;
a remaining current branch coupled to the distribution node and in parallel with the first programmable current sink and the second programmable current sink; and
the programmable current splitter is further configured to:
program, based on the given distribution command, the first programmable current sink to sink the first control current as a first portion of the TDC; and
program, based on the given distribution command, the second programmable current sink to the sink the second control current as a second portion of the TDC.

17. The apparatus of claim 15, wherein the apparatus is integrated in at least one semiconductor die.

18. The apparatus of claim 15, wherein the apparatus is embodied in whole or part as a set top box, music player, video player, entertainment unit, navigation device, communications device, personal digital assistant (PDA), fixed location data unit, or a computer.

19. The apparatus of claim 15, wherein the first current-to-voltage device is further configured to:
sink, concurrently with the first control current and in accordance with the distribution command, a replica of the first control current; and
convert the replica of the first control current to the first control voltage.

20. A method for generating apportioned control voltages, the method comprising:
receiving a distribution command;
generating, via a current source, a total distribution current (TDC) from a power rail, the power rail not being a ground power rail;
splitting, in an apportionment according to the distribution command, the TDC into a first control current, a second control current, and a third control current, the third control current being a remaining portion of the TDC after splitting the first control current and the second control current from the TDC;
generating, via a first current-to-voltage device coupled directly to the power rail, a first control voltage indicative of the first control current;
generating, via a second current-to-voltage device coupled directly to the power rail, a second control voltage indicative of the second control current; and
generating, via a third current-to-voltage device coupled directly to the power rail, a third control voltage indicative of the third control current.

21. The method of claim 20, wherein the distribution command includes a current magnitude and generating the distribution current includes generating the distribution current at a magnitude based, at least in part, on the current magnitude of the distribution command.

22. The method of claim 20, wherein splitting the TDC includes:
feeding the distribution current to a parallel arrangement of a first programmable current sink, a second programmable current sink, and a remaining current branch; and
programming the first programmable current sink and the second programmable current sink to sink, respectively, the first control current and the second control current from the TDC.

23. The method of claim 22, wherein splitting the distribution current includes flowing the remaining portion of the distribution current through the remaining current branch as the third control current.

24. The method of claim 23, wherein the distribution command includes a current magnitude and generating the distribution current includes generating the distribution current at a magnitude based, at least in part, on the current magnitude of the distribution command.

25. The method of claim 23, wherein generating the third control voltage includes converting the third control current flowing through the remaining current branch into the third control voltage.

26. The method of claim 25, further comprising controlling a contribution of a first driver, a second driver, and a third driver to an aggregate output based, at least in part, on the first control voltage, the second control voltage, and the third control voltage, respectively.

27. The method of claim 26, wherein the third driver is a main driver, the first driver is a first post-tap de-emphasis driver receiving a first post-tap input signal, and the second driver is a second post-tap de-emphasis driver receiving a second post-tap input signal.

28. The method of claim 25, further comprising transmitting a de-emphasis signal on a port, with apportioned contribution by the first, second, and third drivers in accordance with the first control voltage, second control voltage, and third control voltage, the transmitting comprising:
receiving a signal corresponding to a current symbol and outputting on the port a corresponding non-emphasis signal having a weight based, at least in part, on the third control voltage;
receiving a first post-tap input signal at a first post-tap de-emphasis driver and outputting on the port a corresponding first post-tap de-emphasis signal having a weight, at least in part, on the first control voltage; and
receiving a second post-tap input signal at a second post-tap de-emphasis driver and outputting on the port a corresponding second post-tap de-emphasis signal having a weight based, at least in part, on the second control voltage.

29. The method of claim 25, wherein programming the first programmable current sink includes programming the first programmable current sink to a first sink state, and generating the first control voltage includes:
programming a replica of the first programmable current sink to a replica of the first sink state;
flowing a current through the replica of the first programmable current sink programmed in the replica of the first sink state; and
converting the current flowing through the replica of the first programmable current sink into the first control voltage.

30. The method of claim 29, wherein the current flowing through the replica of the first programmable current sink is a first replica control current, programming the second programmable current sink includes programming the second programmable current sink to a second sink state, and generating the second control voltage includes:
programming a replica of the second programmable current sink to a replica of the second sink state;
flowing a second replica control current through the replica of the second programmable current sink programmed in the replica of the second sink state; and
converting the second replica control current into the second control voltage.

31. The method of claim 30, further comprising controlling a contribution of a first driver, a second driver, and a third driver to an aggregate output based, at least in part, on the first control voltage, the second control voltage, and the third control voltage, respectively.

32. The method of claim 20, wherein generating a first control voltage comprises:

sinking, concurrently with the first control current, a replica of the first control current in accordance with the distribution command; and
converting the replica of the first control current into the first control voltage.

33. An apparatus for apportioning a plurality of control voltages comprising:
means for generating a total distribution current (TDC) from a power rail, the power rail not being a ground power rail;
means for receiving a distribution command;
means for splitting, in an apportionment based on the distribution command, the TDC into a first control current, a second control current, and a third control current, the third control current being a remaining portion of the TDC after splitting the first control current and the second control current from the TDC;
means for generating a first control voltage, a second control voltage, and a third control voltage indicative, respectively, of the first control current, the second control current, and the third control current, the means for generating the control voltages including:
a first current-to-voltage means coupled directly to the power rail and configured to generate the first control voltage indicative of the first control current;
a second current-to-voltage means coupled directly to the power rail and configured to generate the second control voltage indicative of the second control current; and
a third current-to-voltage means coupled directly to the power rail and configured to generate the third control voltage indicative of the third control current.

34. The apparatus of claim 33, further comprising means for transmitting a de-emphasis signal via an embedded display port with a de-emphasis based on the first control voltage, the second control voltage, and the third control voltage.

35. The apparatus of claim 33, wherein the apparatus is integrated in at least one semiconductor die.

36. The apparatus of claim 33, wherein the apparatus is embodied in whole or part as a set top box, music player, video player, entertainment unit, navigation device, communications device, personal digital assistant (PDA), fixed location data unit, or a computer.

37. The apparatus of claim 33, wherein the means for generating a first control voltage comprises:
means for sinking a replica of the first control current concurrently with the first control current and in accordance with the distribution command; and
means for converting the replica of the first control current into the first control voltage.

38. A method for apportioning control voltages, the method comprising:
step for receiving a distribution command;
step for generating, via a current source, a total distribution current (TDC) from a power rail, the power rail not being a ground power rail;
step for splitting, in an apportionment according to the distribution command, the TDC into a first control current, a second control current, and a third control current, the third control current being a remaining portion of the TDC after splitting the first control current and the second control current from the TDC;
step for generating, via a first current-to-voltage device coupled directly to the power rail, a first control voltage indicative of the first control current;

step for generating, via a second current-to-voltage device coupled directly to the power rail, a second control voltage indicative of the second control current; and step for generating, via a third current-to-voltage device coupled directly to the power rail, a third control voltage indicative of the third control current.

39. A computer-readable medium comprising instructions that, responsive to execution by a processor of an apparatus, cause the processor to perform operations comprising:

receiving a distribution command;

generating, via a current source, a total distribution current (TDC) from a power rail, the power rail not being a ground power rail;

splitting, in an apportionment according to the distribution command, the TDC into a first control current, a second control current, and a third control current, the third control current being a remaining portion of the TDC after splitting the first control current and the second control current from the TDC;

generating, via a first current-to-voltage device coupled directly to the power rail, a first control voltage indicative of the first control current;

generating, via a second current-to-voltage device coupled directly to the power rail, a second control voltage indicative of the second control current; and generating, via a third current-to-voltage device coupled directly to the power rail, a third control voltage indicative of the third control current.

* * * * *